United States Patent [19]

Goldberg

[11] Patent Number: 4,726,615
[45] Date of Patent: Feb. 23, 1988

[54] DISC HANDLING DEVICE

[76] Inventor: Lewis B. Goldberg, 20768 Skouras Dr., Canoga Park, Calif. 91306

[21] Appl. No.: 900,676

[22] Filed: Aug. 27, 1986

[51] Int. Cl.<sup>4</sup> ............................................. B65G 7/12
[52] U.S. Cl. ..................................... 294/16; 299/116; 403/325
[58] Field of Search ................. 414/403, 416; 294/94, 294/97, 116, 16, 31.1; 403/325, 328, 322

[56] References Cited
U.S. PATENT DOCUMENTS

| | | | |
|---|---|---|---|
| 1,464,232 | 8/1923 | Beam | 294/16 X |
| 1,575,185 | 3/1926 | Stenhouse | 294/116 X |
| 1,950,757 | 3/1934 | Smith-Strange | 294/116 X |
| 2,361,463 | 10/1944 | Dorton | 294/31.1 |
| 2,911,251 | 11/1959 | Osborn | 294/116 X |
| 3,012,811 | 12/1961 | Sandrock | 294/116 |
| 3,284,124 | 11/1966 | Kuen | 294/16 |
| 3,581,653 | 6/1971 | Boyer et al. | 294/116 X |
| 4,537,100 | 8/1985 | Palm | 403/325 X |
| 4,555,216 | 11/1985 | Buschor | 294/116 X |

Primary Examiner—Peter A. Aschenbrenner
Attorney, Agent, or Firm—Allan M. Shapiro

[57] ABSTRACT

Disc handling device is configured to pick up, retain and release discs for compact disc players, and the like. The disc handling device has a body from which depend two flexible arms sized to grasp and release the edges of the disc. The body has a central plunger for centering the handling device and for releasing the retention fingers in the compact disc storage box. A first actuator on the body moves the arms to grasp position, and a second actuator moves the arms to a release position.

18 Claims, 7 Drawing Figures

DISC HANDLING DEVICE

BACKGROUND OF THE INVENTION

This invention is directed to a handling device particularly suited for picking up and releasing discs for compact disc players and the like.

Music and other audio signals are sampled, digitized and then recorded on discs. The modern compact disc is supplied to the consumer in a box in which the disc is protected and retained. Since a great deal of information is coded on the disc, it is necessary to protect the surface of the disc from receiving noise information from such sources as dust and fingerprints. Thus, the disc should be enclosed, and if handled in the fingers, should only be handled at the edges. In order to prevent the disc from moving in its box, which movement might have an adverse effect on the information bearing surface, the box is provided with a plurality of resilient fingers which engage within the central hole in the disc to hold it in place. These fingers must be released when the disc is lifted out of its box. At present, there is no device which permits the handling of such a disc without finger contact on the disc.

SUMMARY OF THE INVENTION

In order to aid in the understanding of this invention, it can be stated in essentially summary form that it is directed to a disc handling device particularly suitable for picking up, moving and depositing discs carrying audio information thereon. The device has a body which carries first and second arms flexibly mounted thereon. The arms have surfaces which can engage the discs. A first actuator closes the arms so that they can grasp the disc, and the first actuator is connected so that when it is released, the surfaces on the arms engage the disc so that it may be lifted with the device. A second actuator on the body releases the arms so that the disc is released therefrom.

It is, thus, an object and advantage of this invention to provide a disc handling device which is particularly suitable for picking up, placing and releasing an audio disc.

It is a further object and advantage of this invention to provide a disc handling device which has first and second arms which are spread and released by operation of a first actuator to permit them to grasp on the edges of an audio disc and a second actuator which releases the arms from grasp on the audio disc.

It is a further object and advantage of this invention to provide a disc handling device which is economic to build and reliable in operational character so that it can be employed to quickly, economically and safely grasp, position and release discs.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

DESCRIPTION OF THE PREFERRED EMBODIMENT

The disc handling device 10 of this invention is particularly designed for handling compact audio discs such as the one indicated at 12, but is also useful for handling other circular devices such as vinyl analog audio discs for phonographs or magnetic hard discs for computers. Other similar discs might usefully be handled by a similar device. In each case, the disc is of different size so that a somewhat different size of the disc handling device would be useful in each case. Its use in handling compact digital audio discs is the preferred embodiment and is described.

Figure 4:
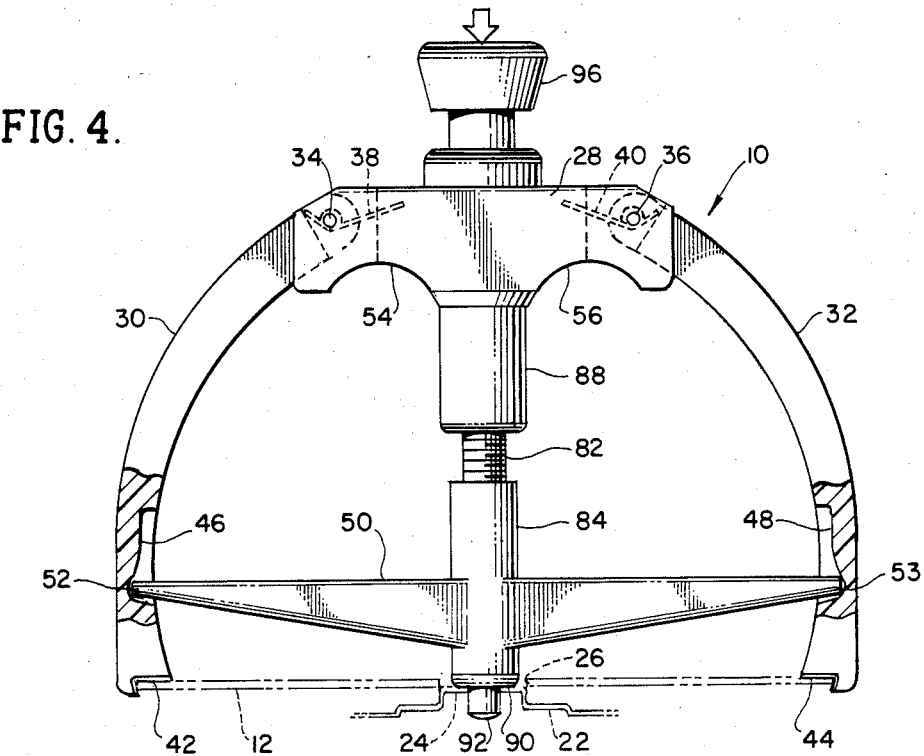
FIG. 4 is a view similar to FIG. 3, showing the device grasping a disc.
Figure 5:
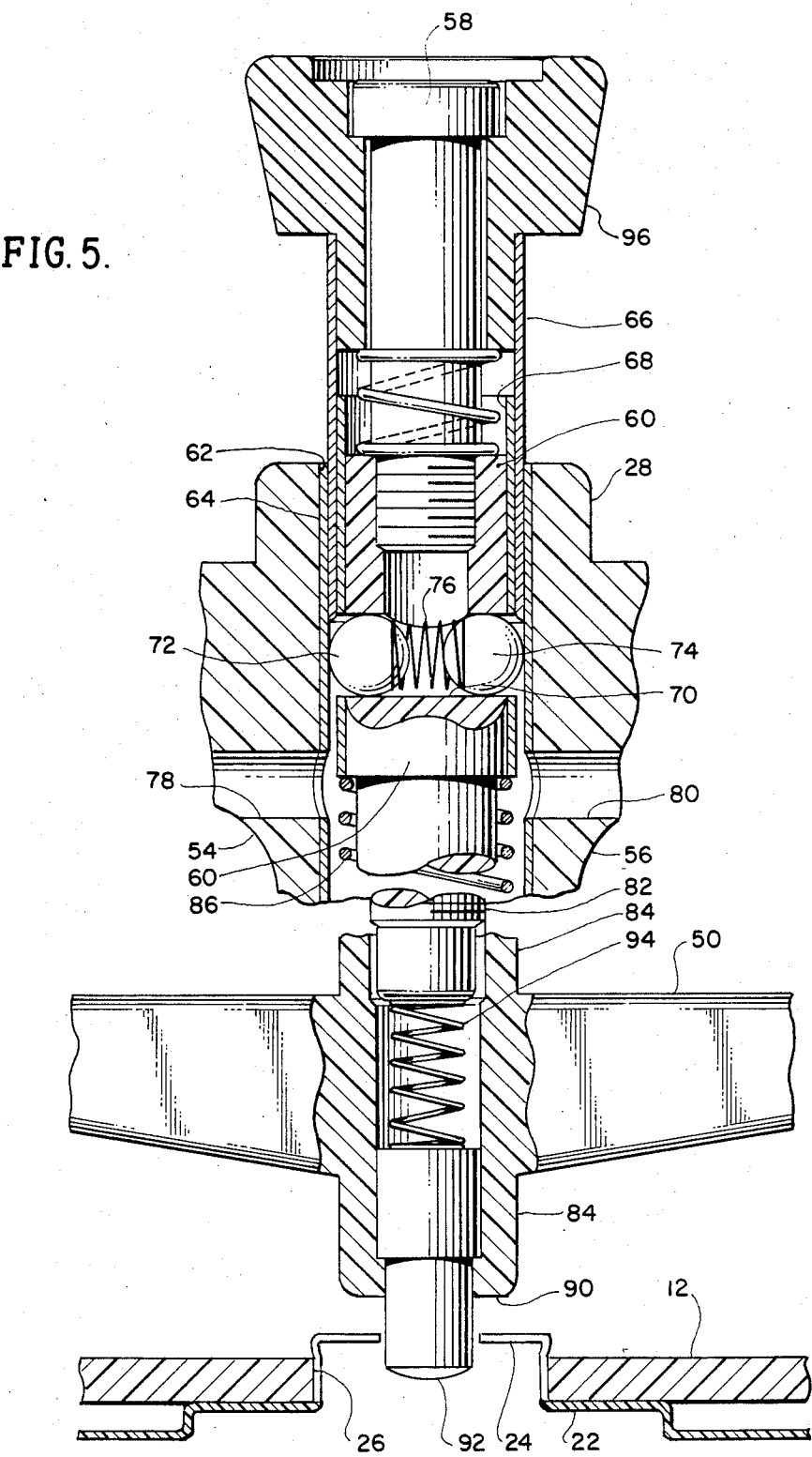
FIG. 5 is an enlarged central section, with parts broken away, substantially through the center of the device, showing it in the start position of FIG. 3.
Figure 6:
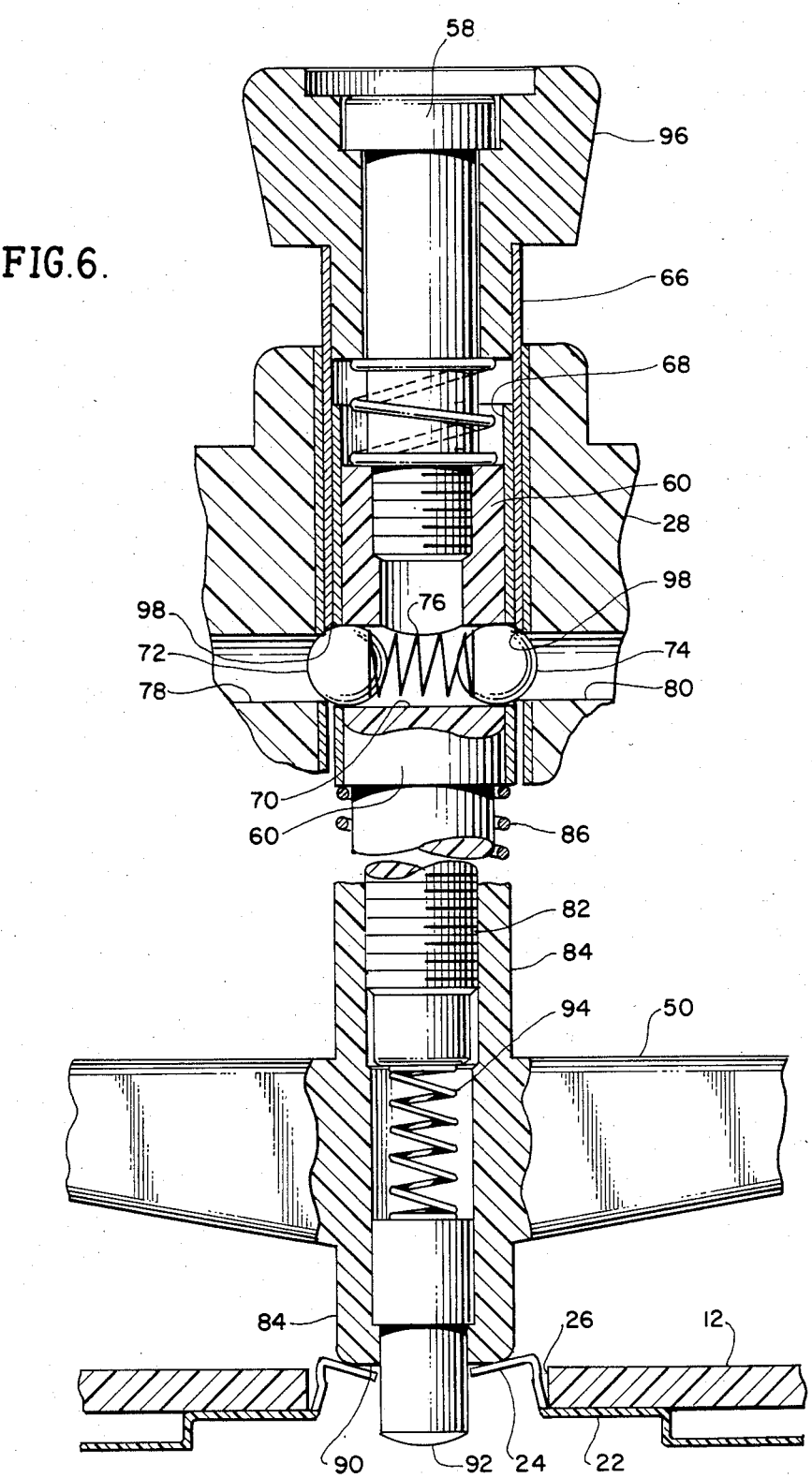
FIG. 6 is a view similar to FIG. 5, showing it in the grip position of FIG. 4.
Figure 7:
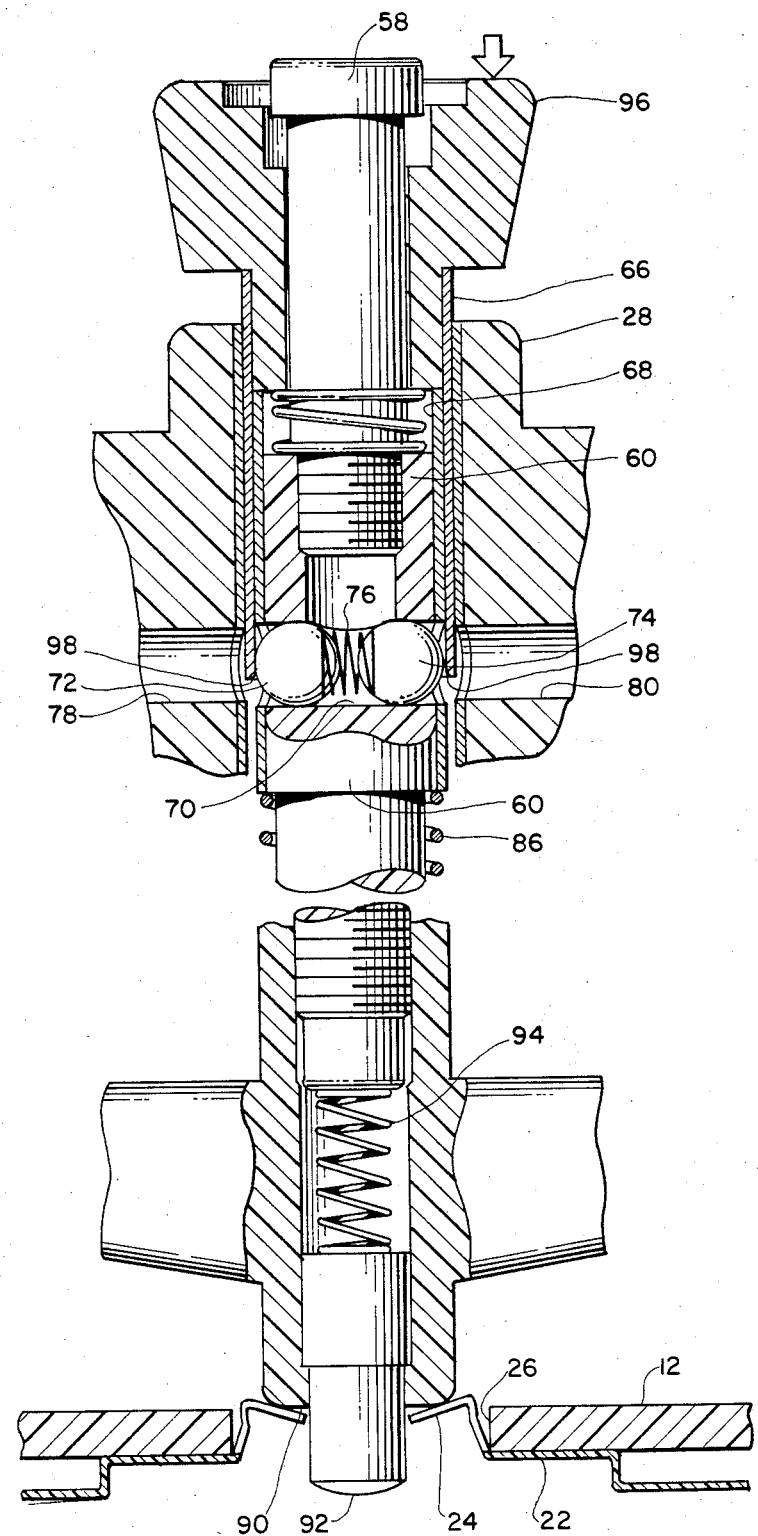
FIG. 7 is a view similar to FIG. 5, showing it in the release position.

The compact disc 12 is usually supplied in a box 14 which has a base 16 and a box cover 18 which is hinged to the base. The box base has a recess 20 which is circular and larger than the diameter of the round disc 12 to provide a clearance. The recess is deeper than the thickness of disc 12 so that the disc does not touch the bottom of the recess, but it is held thereabove by means of a shoulder 22, see FIGS. 3 and 4. A plurality of spring fingers 24 extend above shoulder 22 and resiliently engage within the central hole 26 in the dics. The spring fingers are configured so that they resiliently engage within the hole in the disc when engaged therein to hold the disc in place. When the fingers are pressed down, in the direction downward of the sheet in FIGS. 3 and 4, the spring fingers release from the interior of the central hole 26. FIG. 5 shows the engaged position of the spring fingers 24 on the disc 12, while FIGS. 6 and 7 show the release position of the spring fingers 24 on the disc 12.

Figure 1:
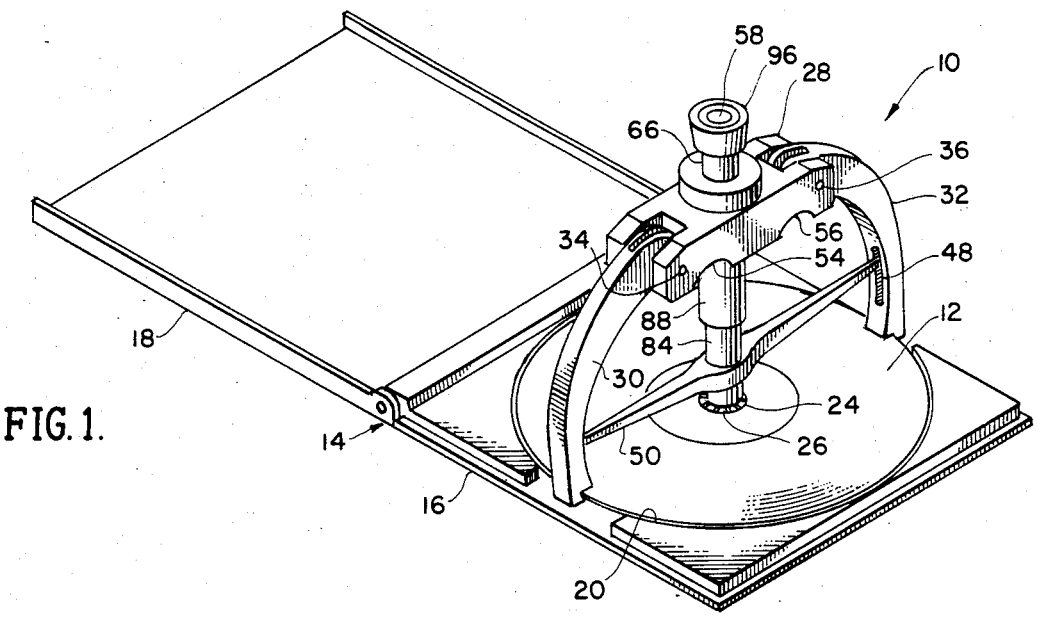
FIG. 1 is an isometric view of the disc handling device of this invention showing the device in association with an audio disc in its box, with the box open.
Figure 2:
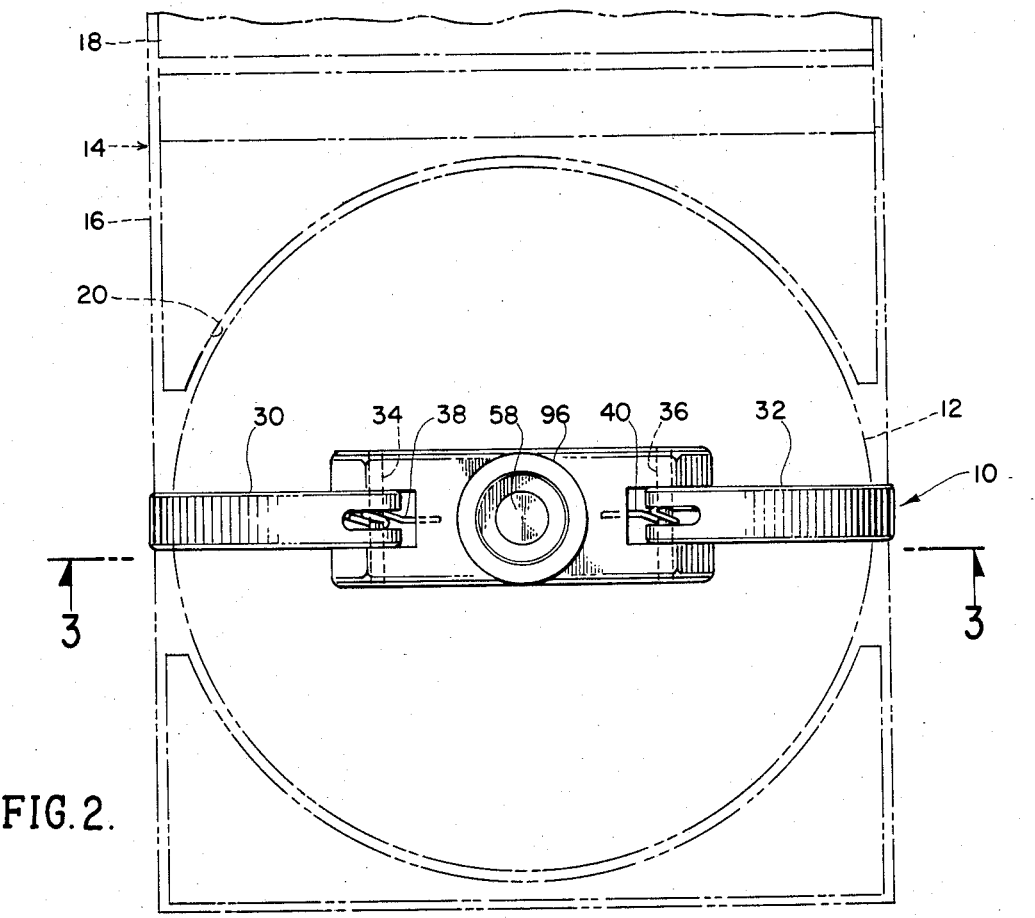
FIG. 2 is a plan view of the disc handling device, showing the disc and box in phantom line.
Figure 3:
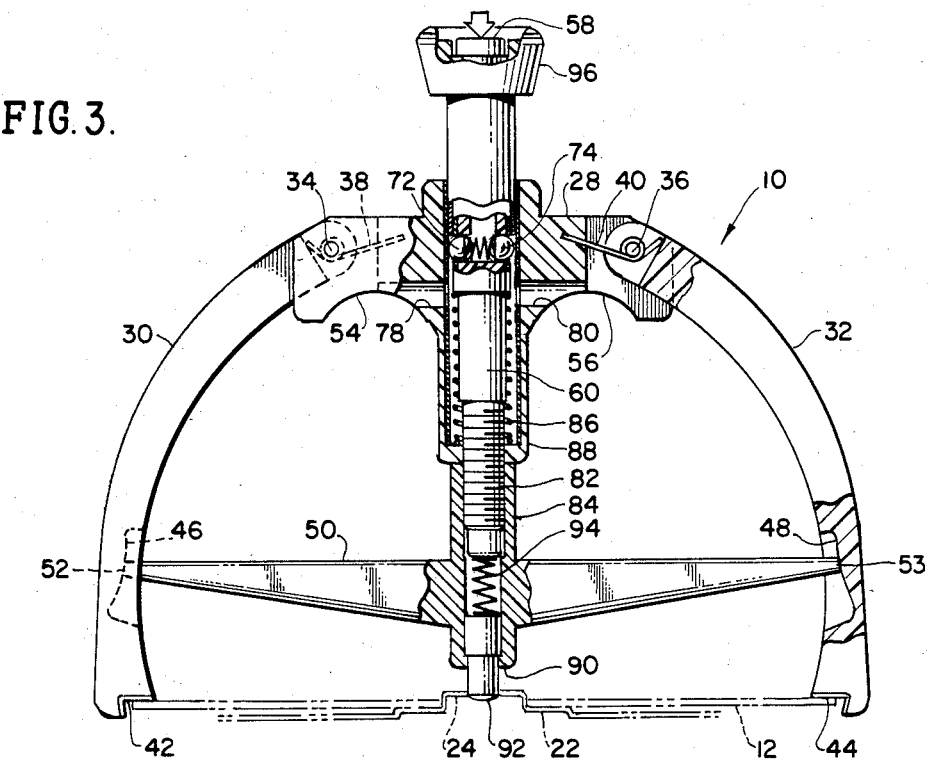
FIG. 3 is a side-elevational view of the disc handling device in the open position ready to grasp a disc, as seen generally along the line 3—3 of FIG. 2, with parts broken away and parts taken in section.

Disc handling device 10 has a body 28 on which arms 30 and 32 are movably mounted. As shown, the arms 30 and 32 are respectively pivoted on pivot pins 34 and 36, see FIGS. 3 and 4, and are resiliently urged towards each other by means of springs 38 and 40, respectively wrapped around the pivot pins 34 and 36 and respectively engaged on arms 30 and 32 together with being engaged on the body 28. The bottom ends of arms 30 and 32 are respectively fitted with grippers 42 and 44 which are configured to engage upon the edges of the disc 12. FIG. 4 shows the grippers in engagement with the edges of the disc and resiliently engaged therewith by means of the spring force. FIG. 3 shows the arms spread sufficiently so that the grippers are out of engagement with the edges of the disc. The arms are sufficiently resiliently mounted to achieve this grip and separation from grip. While the arms are shown as being pivoted on the body, with springs to provide the resilient closing action, it can be appreciated that the arms can be integrally formed with the body and made of a resilient material which permits this grip and separation. Arms 30 and 32 are respectively provided with cam grooves which have cam surfaces 46 and 48 facing each other. Spreader 50 has cam follower tips 52 and 53 which are engaged against the cam surfaces within the cam groove. The spreader moves up and down against the cam surfaces to urge the arms from the closed position shown in FIG. 4 to the open position shown in FIG. 3. As is seen in these figures, the cam surfaces are deeper in the arms in the direction towards the free end of the arms so that, as the spreader moves towards the free end of the arms, those free ends with their grippers are permitted to move together through the resiliency of their mounting.

FIG. 5 is an enlarged drawing corresponding to FIG. 3, with parts broken away. FIGS. 3 and 5 represent the device in its starting position where it is held in the hand approaching the disc to be picked up. As it is held in the hand, the index and middle finger are respectively engaged in recesses 54 and 56, while the thumb is engaged on the first actuator 58. The first actuator is a pushbutton threaded into detent rod 60. Bore 62 in body 28 carries bearing sleeve 64 therein. Detent release tube 66 slides within sleeve 64 and bearing sleeve 68 slides within detent release tube 66. Bearing sleeve 68 is carried on the exterior of detent rod 60. Sleeves 64 and 68 are provided for the purpose of presenting good bearing surfaces to minimize wear and provide long life to the device. With well-chosen, long-wearing materials, the use of these separate sleeves could be avoided. They provide sliding bearing surfaces for the parts with which they are associated.

Cross bore 70 in detent rod 60 carries a pair of detent balls 72 and 74. Detent spring 76 is a compression spring between and engaged with detent balls 72 and 74. As the first actuator 58 is depressed and detent rod 60 moves downward through body 28, the detent rod reaches a position where the detent balls are in alignment with detent recesses 78 and 80, see FIG. 6. At that point, the detent balls spring into the recesses and retain the first actuator in the depressed, actuated position. As is seen in FIG. 3, below the detent cross bore 70, the detent rod 60 carries threads 82 which engage in central tube 84 of spreader 50. Compression spring 86 is positioned within spring housing 88, which is part of body 28. The upper end of compression spring 86 engaged against a shoulder on detent rod 60 urges the detent rod 60 upward to the unactuated position shown in FIGS. 3 and 5. In this position, the upper end of central tube 84 stops against the bottom of spring housing 88 to define the unactuated upper position of spreader 50 at detent rod 60. As previously stated, in this unactuated position, the arms 30 and 32 together with their grippers 42 and 44 are spread.

It should be noted that central tube 84 of spreader 50 has a downwardly facing nose surface 90. Centering plug 92 extends centrally out of this nose surface and is urged in the extended position by means of compression spring 94. Centering plug 92 is configured to enter within the opening defined between spring fingers 24 of the disc retainer. As is seen in FIGS. 3 and 4, as the device is brought into position, plug 92 enters the center hole between the spring fingers and grippers 42 and 44 rest on the top surface of the disc 12. In this position, actuator 58 is depressed. Depressing the actuator causes three simultaneous actions. The completion of this actuation is shown in FIGS. 4 and 6. As the actuator 58 is depressed, nose surface 90 engages on spring fingers 24 and presses them down. Due to their structure, this pivots them inwardly, as illustrated in FIG. 6, so that the spring fingers unlock from the central hole 26 in the disc 12. At the same time, spreader 50 moves downward with respect to body 28 and arms 30 and 32. This moves the cam follower tips 52 and 53 downward with respect to the cam surfaces 46 and 48 to permit the arms to move together so that the grippers 42 and 44 engage on the edges of the compact disc. The disc is now released and grasped so that, if the device is raised in this condition, the disc will come with it. However, to avoid inadvertently dropping the disc by inadvertent release of the first actuator 58, detent balls 72 and 74 are thrust outward to extend partway into detent recesses 78 and 80, see FIG. 6. This resilient detent is strong enough to overcome the return force of actuator return spring 86. Thus, the disc is retained with the detent rod 60 in the actuated position, even though no downward force is continued on actuator 58. By manual manipulation of the device 10, the disc 12 is brought to its new position. It is put in position by manipulation of device 10, and the device 10 is released.

Release is accomplished by pressing on release actuator 96 which is mounted on detent release tube 66. As seen in FIG. 6, when the release actuator 96 is unactuated, its bottom edge 98 is positioned above the detent recesses 78 and 80. However, as the release actuator or second actuator 96 is pressed, the bottom edge 98 engages the spherical surfaces of detent balls 72 and 74 to thrust the detent balls back into their cross bore 70 against detent spring 76, to the position shown in FIG. 7. This releases detent rod 60 so that, in the absence of any applied force, the detent rod 60, spreader 50 and actuator 58 rise to the unactuated position shown in FIGS. 3 and 5. This releases the grippers from the edges of the disc so that the disc 12 is released from the device. During release, nose surface 90 can be engaged against spring fingers 24 to depress them to permit placing the disc thereon during release of the disc. If the disc then has not seated completely on shoulder 22, the device can be inverted so that the hole in the top surface of actuator 96 fits around the fingers 24 and the actuator 96 presses against the disc 12 to force it down onto shoulder 22, with fingers 24 then completely engaged onto the disc. Thus, a disc handling cycle is completed with safe handling of the disc without manual handling of the disc.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A disc handling device comprising:
   a body;
   first and second arms mounted on said body, at least said first arm being movably mounted with respect to said body, a first gripper on said first arm and a second gripper on said second arm, said arms being arranged so that said grippers are movable towards and away from each other, said grippers being spaced so that they can engage on and grip the edges of a disc;
   a first cam surface on said first arm and a spreader movably mounted on said body for engaging said first cam surface so as to move said first gripper towards and away from said second gripper;

a first spreader movably mounted with respect to said body and connected to said spreader to move said spreader from a position where said grippers are away from the edges of a disc to a position where said grippers are positioned so that they can engage the edges of a disc;

a detent for permitting said grippers to remain in disc-gripping position; and a second actuator connected to said detent to disengage said detent so that actuation of said second actuator causes said grippers to move to their non-gripping position.

2. The disc handling device of claim 1 further including a detent for permitting said grippers to remain in disc-gripping position.

3. The disc handling device of claim 2 wherein there is a detent rod movably mounted in said body, said detent rod being connected to said arm-moving means so that movement of said detent rod causes movement of said first gripper towards and away from gripping position, said detent interengaging between said body and said detent rod to retain said rod in arm-gripping position when said detent is actuated.

4. A disc handling device comprising:

a body;

first and second arms mounted on said body, at least said first arm being movably mounted with respect to said body, a first gripper on said first arm and a second gripper on said second arm, said arms being arranged so that said grippers are movable towards and away from each other, said grippers being spaced so that they can engage on and grip the edges of a disc;

means engaging said arms for moving said grippers on said arms towards and away from each other to grasp and release discs;

a detent rod movably mounted in said body, said detent rod being connected to said arm-moving means so that movement of said detent rod causes movement of said first gripper towards and away from gripping position, a detent, said detent comprising a cross bore through said detent rod and at least one ball in said cross bore and a spring to resiliently urge said at least one ball outward out of said cross bore, together with a detent recess in said body in alignment with said cross bore when said detent rod is in gripper gripping position.

5. The disc handling device of claim 4 wherein there is a first actuator on said detent rod for moving it from non-gripping to gripping position at which said detent ball retains said detent rod in detent position and there is a second actuator on said body for moving said ball out of said detent recess to release said detent rod and first actuator to non-gripping position.

6. The disc handling device of claim 5 wherein said means for moving said grippers toward and away from each other comprise a first cam surface on said first arm and a spreader movably mounted on said body for engaging said first cam surface so as to move said first gripper towards and away from said second gripper.

7. The disc handling device of claim 6 wherein said second arm is also movably mounted with respect to said body and there is a second cam surface on said second arm, said spreader engaging both said first and second cam surfaces to move said first and second grippers towards and away from each other.

8. The disc handling device of claim 7 wherein there is a first actuator movably mounted with respect to said body and connected to said spreader to move said spreader from a position where said grippers are away from the edges of a disc to a position where said grippers are positioned so that they can engage the edges of a disc.

9. A disc handling device comprising:

a body;

first and second arms movably mounted on said body, first and second grippers respectively mounted on said first and second arms so that arm motion with respect to said body moves said grippers into and out of disc edge-gripping position, cam surfaces on said first and second arms;

a first actuator movably mounted on said body, a detent rod movably mounted with respect to said body and connected to be actuated by said first actuator;

a spreader mounted on said detent rod, said spreader having first and second ends respectively engaged on said first and second cam surfaces on said first and second arms, said spreader being movable by motion of said detent rod so that said spreader moves from an unactuated first position wherein said grippers are away from a disc-engaging position to a second, actuated position wherein said grippers are in disc edge-engaging position;

a detent engaging between said detent rod and said body for retaining said detent rod in its second position when said actuator moves said detent rod to its second position; and a second actuator movably mounted on said body, said second actuator being connected to said detent to release said detent to permit said detent rod to return from its second position to its first position.

10. The disc handling device of claim 9 wherein said body is shaped to be manually engaged and said first and second actuators are positioned and shaped to be finger actuated while said body is manually engaged.

11. The disc handling device of claim 10 wherein a spring is engaged between said detent rod and said body to urge said detent rod at its actuator to said first, unactuated position.

12. A disc handling device comprising:

a body;

said body being shaped to be manually engaged;

first and second arms movably mounted on said body, first and second grippers respectively mounted on said first and second arms so that arm motion with respect to said body moves said grippers into and out of disc edge-gripping position, cam surfaces on said first and second arms;

a first actuator movably mounted on said body, said first actuator being positioned to be finger-actuated while said body is manually engaged, a detent rod movably mounted with respect to said body and connect to be actuated by said first actuator;

a spring engaged between said detent rod and said body to urge said detent rod and its actuator to said first, unactuated position;

a spreader mounted on said detent rod, said spreader having first and second ends respectively engaged on said first and second cam surfaces on said first and second arms, said spreader being movable by motion of said detent rod so that said spreader moves from an unactuated first position wherein said grippers are away from a disc-engaging position to a second, actuated position wherein said grippers are in disc edge-engaging position;

a detent engaged between said detent rod and said body for retaining said detent rod in its second position when said actuator moves said detent rod to its second position;

said detent comprising a cross bore in said detent rod and at least one detent in said cross bore, a spring in said cross bore to urge said detent out of said cross bore and a detent recess in said body aligned with said cross bore when said detent rod is in its second position so that said detent extends from its cross bore and extends into its recess to retain said detent rod in its second position; and a second actuator shaped to be finger-actuated movably mounted on said body, said second actuator being connected to said detent to release said detent to permit said detent rod to return from its second position to its first position.

13. The disc handling device of claim 12 wherein said body is shaped to be manually engaged and said first and second actuators are positioned and shaped to be finger actuated while said body is manually engaged.

14. The disc handling device of claim 13 wherein a spring is engaged between said detent rod and said body to urge said detent rod and its actuator to said first, unactuated position.

15. The method of handling a compact audio disc including removing it from its box wherein it is retained by spring fingers engaged in the center hole of the disc, comprising the steps of:

spreading the arms and grippers on a disc handling device so that the grippers can engage around the edges of a compact audio disc;

releasing the arms so that the grippers engage on the edges of the compact disc;

pressing down on the spring fingers in the box so that the spring fingers disengage from the central hole of the compact disc; and lifting the device and lifting the disc therewith so that the compact audio disc is lifted out of its box and retained by said disc handling device without manual touching of the disc.

16. The method of claim 15 wherein the step of pressing down on the spring fingers and releasing the grippers to engage on the edges of the disc is simultaneously performed.

17. The method of claim 16 wherein the grippers are detented in an engaged position so that the disc handling device can carry the disc without manually applied disc retention forces to the disc handling device.

18. The method of claim 17 further including the step of releasing the retaining detent to release the grippers and release the compact audio disc.

* * * * *